April 16, 1963 — M. T. ULRICH — 3,085,765
FISHING REEL
Filed July 29, 1959

INVENTOR
MARTIN T. ULRICH
BY Gardner & Zimmerman
ATTORNEYS 3,085,765
FISHING REEL
Martin T. Ulrich, P.O. Box 287, Fremont, Calif.
Filed July 29, 1959, Ser. No. 830,414
4 Claims. (Cl. 242—84.1)

The present invention relates generally to fishing reels and is particularly directed to line anti-fouling means for employment therewith.

Fishing line as conventionally wound in substantially close helical fashion on the spool of a reel is readily susceptible to fouling, particularly during paying out of the line. Such fouling of the line is in large part due to to the intrinsic torsional twisting forces attendant in the helically wound line. When insufficient retentive tension is placed on the line, for example during the paying out of same, the twisting forces tend to expend themselves in forming kinks in the line. To remove the kinks it is necessary to twist the line in reversed sense to that of the twisting force which created the kink. Although conventional reels have provisions for reversing the direction of rotation of the spool to facilitate retrieving of the line, such winding of the line in the opposite direction to that from which it is payed out is ineffectual in removing kinks since the twisting forces established upon winding are in the same sense as those which effected the kink. Hence reeling in of the line merely enhances the kinking action.

The present invention overcomes the foregoing difficulty by providing line anti-fouling means for selectively effecting reversed winding (i.e., winding in reversed sense of the usual winding direction) of the line upon the creation of a kink therein. The reversed winding in accordance with the present invention establishes twisting forces in the line with a sense opposed to that of the forces which created the kink and hence removes same.

It is therefore an object of the present invention to provide means for the selective removal of kinks in a line payed-out from a fishing reel.

Another object of the invention is the provision of a fishing reel having an anti-fouling device for selectively effecting reversed winding of the line.

A further object of the present invention is to provide means on a fishing reel for selectively establishing torsional twisting forces in opposition to those already set up therein by normal helical winding of the line on the reel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
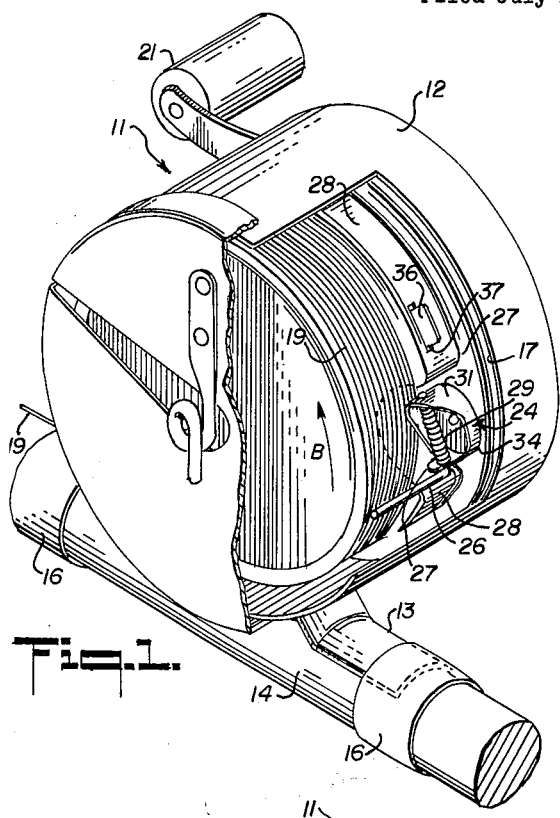
FIGURE 1 is a perspective view of a fishing reel with the anti-fouling device embodied therein, portions of the reel being broken away to more clearly illustrate the device.

Referring now to the drawing, there is provided a fishing reel 11 of generally conventional construction. The reel comprises a hollow cylindrical housing 12 having a base 13 for facilitating removable securance to a fishing rod 14 by means of slide rings 16 in the conventional manner. The housing additionally is provided with a circumferentially extending open portion 17 to facilitate access to the interior of the housing.

Within the housing 12 there is provided a spool 18 concentrically mounted for rotation therein. Fishing line 19 is wound in substantially helical or spiral fashion upon the spool as is conventional and the end of the line led exteriorly from the housing and forwardly of the rod 14. The helical or spiral winding may be achieved through conventional means such as a transversely moving line guiding mechanism (not shown) or such winding may be achieved manually by the use of the thumb in continuously shifting the line along the axis of the spool. An operating arm and handle 1 is connected to the spool 18 to facilitate rotation of same through a conventional gear drive including free wheeling clutch (not shown). A selector lever 22 (see FIGURE 2) is provided on one side of the housing 12 and operatively connected to the gear drive to facilitate selection of clockwise, counter-clockwise, and free-wheeling rotation of the spool. A drag adjusting star wheel 23 is additionally provided at one side of the housing to provide ready adjustment of drag on the line 19 in the usual manner.

The conventional reel 11 described structurally hereinbefore may be utilized to pay-out and reel in the line 19 in the usual manner.

However, as indicated previously, the line 19 as payed out from the spool 18 is highly susceptible to fouling by virtue of the kinks which are prevalent in the line due to the torsional twisting forces established therein during winding of the line upon the spool. In conventional fishing reels there is no provision for effectively removing the kinks aside from manually laboriously twisting the line in proper sense to remove the kinks. To overcome this difficulty the present invention provides a selectably engaging anti-fouling device 24 as an integral portion of the reel 11. The device is simply provided as means for selectively clamping the line 19 to the spool 18 at point where the line departs from the spool. With the line thus secured, continued rotation of the spool in a paying-out direction causes the line beyond the point of departure to be wound upon the spool in reverse direction from the normal direction of winding thereon. Such reversed winding of the line causes twisting thereof with a rotational sense opposite to that of the kinks and hence relieves same.

The anti-fouling device 24 preferably comprises an L-shaped arm 26 mounted upon one side of the circumferential periphery of the spool 18 in such a manner that the arm may be selectively pivoted from an unobstructing inactive position to an active position transversely of the spool in radially spaced relation to the coiled line thereon. Further rotation of the spool in the pay out direction (indicated by the arrow B) causes the arm to engage the line at its point of departure from the spool so that a tension is created on the line which in turn forces the arm to rotate in a clockwise direction as indicated by the arrow A in FIGURE 2. The arm is thus rotated until it comes into clamping engagement with the line wound on the spool.

Figure 2:
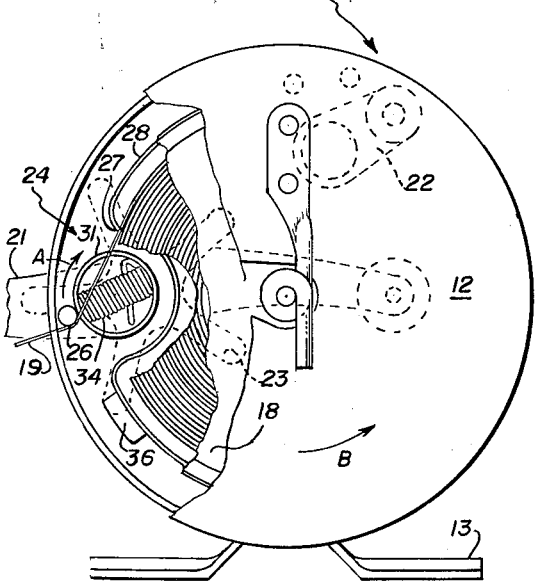
FIGURE 2 is a side elevational view of the fishing reel with portions broken away and illustrating particularly the anti-fouling device in operable position.
Figure 3:
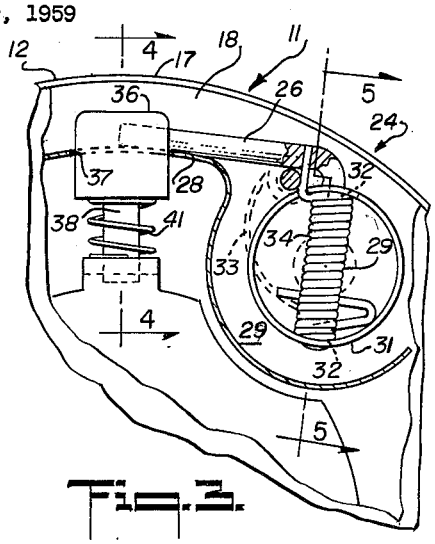
FIGURE 3 is a fragmentary enlarged side elevational view partially in section showing the anti-fouling device in its inoperative position.
Figure 4:
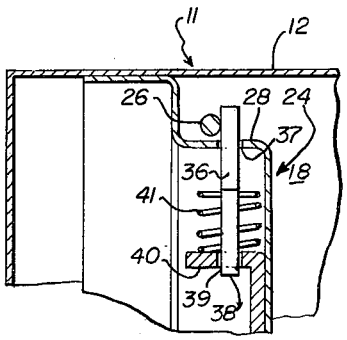
FIGURE 4 is a cross sectional view taken along the line of 4—4 of FIGURE 3.
Figure 5:
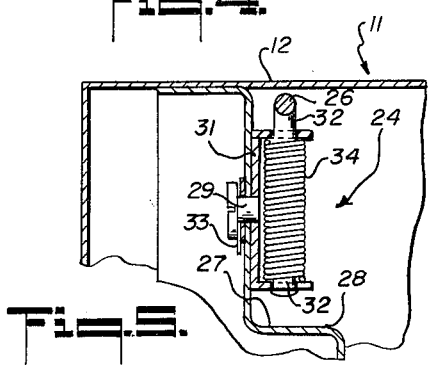
FIGURE 5 is a cross sectional view taken along the line 5—5 of FIGURE 3.

The arm is mounted in a substantially semi-circular recess or depression 27 provided in an outwardly stepped annular rim 28 which is formed as an integral part of the spool 18. The outwardly stepped rim 28 contains side faces (as best seen in FIGURES 4 and 5) which are connected by the stepped portion of the rim and which lie in planes normal to the axis of the spool. A drum 31 is mounted for rotation concentrically within the recess 27 on the outer side face of the annular rim on a pin 29. The drum is provided with diametrically opposed bores 32 in its periphery through which one leg of the L-shaped arm 26 extends and is pivotable therein about the axis of such leg. The drum, moreover, is spring loaded as by means of a coil spring 33 to resist rotation in a clockwise direction (indicated by the arrow A) as viewed in FIGURE 2, or in a direction opposite to that of the rotation of the spool 18 effecting pay out of the line. The spring 33 when in an unstressed condition retains the drum in a rotational position in which the arm 26 may be disposed in a position overlying the stepped portion of rim 28 as depicted in FIGURE 3. In addition, the arm is spring loaded as by means of a spiral spring 34 disposed concentrically about the portion of the leg of the arm which extends through the drum. Spring 34 is secured to the leg of the arm in such a manner that the arm resists rotation toward the rim 28 and has a normal position with spring 34 unstressed parallel to the axis of the spool 18 in radially spaced relation to the line 19 coiled thereon. Hence, if the arm 26 is rotated into engagement with the shoulder portion, the spring 34 tends to return the arm to its normal transverse position parallel to the axis of the spool, which position is the operable position of the arm mentioned hereinbefore.

In order that the arm 26 may be selectably retained in an out-of-the-way inactive position, i.e., the position wherein the arm overlies the rim 28, a depressable spring loaded tongue 36 is provided in the stepped portion of the rim adjacent the depression 27 for retentive engagement with the arm. More specifically the tongue slideably projects radially upward through a slot 37 in the rim and has a reduced section 38 which extends radially downward through a similar radially opposed slot 39 provided in a lug 40 secured to the wall of spool 18. A spiral spring 41 is disposed about the reduced section 39 between the lug 40 and enlarged portion of the tongue to hence retain same in a depressable position projecting upwardly through slot 37. The arm 26 may thus be pivoted to the inactive position in engagement with the stepped portion of rim 28 and retained therein by the tongue 36. The arm may then be selectively released to the operable position by depressing the tongue, the stressed spring 34 rotating the arm transversely of the spool 18.

In summary, it is to be noted that when a kink is observed in the leading portions of the line 19, subsequent to casting, the anti-fouling arm 26 may be released into operable position as described above by depressing the tongue 36, access thereto being afforded by the open portion 17 in housing 12. Upon rotation of the spool 18, as effected by turning of the operating handle 21, in the direction indicated by arrow B which normally pays out the line 19, the transversely projecting arm 26 snags the line at its point of departure from the reel as illustrated in FIGURE 2. The forward tension on the line pulls against the arm 26 and creates a clockwise moment thereon about the axis of drum 31 upon further rotation of spool 18 in the pay-out direction indicated by arrow B which rotatably urges the arm as secured to drum 31 against the spring loading of the drum in the direction indicated by arrow A and into clamping engagement with the coils of line wound upon the spool. The arm 26 hence prevents more line from being payed out from the spool and effects reversed winding of the leading or previously payed-out portions of the line upon the spool. Inasmuch as the reversed winding is with a sense opposite to the normal sense the line is wound upon the spool, the line is twisted with a sense opposite to that which effected the kink. Hence after a sufficient number of turns of the line are wound in reversed direction, the corresponding reversed twisting of the line relieves the kink. The reversed winding turns of line may then be payed out by reversing rotation of the spool 18 and the arm 26 then pivoted to its inactive position for retention therein by tongue 36. The rotation of the spool is then again reversed to pay out the line in the normal manner.

What is claimed is:

1. A line anti-fouling device for a fishing reel including at least a rotatable spool having line wound thereon, comprising a pivotable mounting member rotatably mounted on said spool, arm means connected to said member and movable into a position overlying and spaced from said line, said member being pivotable into a position with said arm means in clamping engagement with said line whereby, upon rotation of said spool in a direction normally unwinding said line, said line will be rewound upon said spool in a reversed direction from the normal direction of winding thereon, said mounting member being rotatable about an axis parallel to that of said spool, and said arm means comprising an arm member pivotably mounted on said mounting member and pivotable relative to said mounting member out of said overlying position to disengage said arm means from said clamping engagement with said line.

2. A line anti-fouling device for a fishing reel including at least a rotatable spool having line wound thereon and having side rim portions between which said line is wound, at least one of said side rim portions having pivotable arm means connected thereto in pivotable engagement therewith, a first spring means connected to said pivotable arm means and urging said arm means to pivot into a position parallel to the axis of said spool and overlying the line wound thereon, a second spring means connected to said pivotable arm means and urging said arm means to pivot into a position in engagement with said line.

3. In a line anti-fouling device for a fishing reel, said reel including at least a rotatable spool having fishing line wound thereon, the combination comprising a radially outwardly stepped annular rim at one side of said spool, a drum secured adjacent said rim projecting axially inwardly therefrom and adapted for rotation about the drum axis, a first spring means connected to said drum to resist rotation of said drum in a sense opposite the line paying out sense of rotation of said spool, an L-shaped arm having one leg extending diametrically through said drum and rotatable about the axis of the leg, a second spring means connected to said arm to resist rotation of said arm toward said rim and normally maintaining said arm in a position parallel to the axis of the spool in radially spaced relation to the line wound thereon, and releasable retention means for retaining said arm in a position parallel to the side face of said rim.

4. A line anti-fouling device for a fishing reel, said reel including at least a rotatable spool having fishing line wound thereon, comprising a radially outwardly stepped annular rim at one side of said spool, said rim including a stepped surface portion disposed substantially parallel to the axis of said spool, said stepped portion having an arcuate substantially semi-circular depression therein, a drum disposed concentrically within said depression and projecting inwardly from said one side of said spool, said drum mounted for rotation about its axis, a first spring means connected to said drum to resist rotation of said drum in a sense opposite the line paying out sense of rotation of said spool, an L-shaped arm having one leg extending diametrically through said drum and rotatable about the axis of said one leg, a second spring means connected to said arm to resist rotation of said arm toward said rim to a position overlying said stepped portion, said second spring means being further adapted to maintain said arm in a normal position parallel to the axis of said spool in radially spaced relation to the line wound thereon, and a depressable tongue projecting radially outward from said stepped portion of said rim at a point adjacent said depression for releasably retentively engaging said arm in its position overlying said stepped portion.

References Cited in the file of this patent
UNITED STATES PATENTS

| | | | |
|---|---|---|---|
| 117,630 | Hillard | Aug. 1, | 1871 |
| 331,956 | Ford | Dec. 8, | 1885 |
| 1,612,177 | Catucci | Dec. 28, | 1926 |
| 2,367,214 | Hedge | Jan. 16, | 1945 |
| 2,397,955 | Fowler | Apr. 9, | 1946 |
| 2,941,748 | Matthieson | June 21, | 1960 |